United States Patent

[11] 3,589,173

[72] Inventor Glen A. Hemstock
      Princeton, N.J.
[21] Appl. No. 821,828
[22] Filed May 5, 1969
[45] Patented June 29, 1971
[73] Assignee Engelhard Minerals & Chemicals
      Corporation
      Woodbridge, N.J.

[54] SYSTEM AND METHOD FOR MEASURING FILM POROSITY
     3 Claims, 2 Drawing Figs.
[52] U.S. Cl. ................................................. 73/38
[51] Int. Cl. ......................................... G01n 15/08
[50] Field of Search .................................. 73/38, 73,
       159, 37, 432; 118/300; 134/151, 109

[56]                References Cited
              UNITED STATES PATENTS
     3,282,273  11/1966  Johnston et al. ............ 134/109 X Primary Examiner—Louis R. Prince
Assistant Examiner—William A. Henry, II
Attorneys—Melvin C. Flint and Inez L. Moselle ABSTRACT: The porosity of a dry porous film of known weight and specific gravity is determined by spraying the film uniformly with a sorbable liquid which does not cause the dry film to swell. The total amount of liquid that has been sprayed and the gloss of the film are periodically measured. The volume of liquid required to effect a sharp increase in the gloss of the film is ascertained and percent porosity is computed using this volume of liquid as representing the volume of voids in the film.

The apparatus used in determining the porosity includes a support with an upper platform for stationing both a thin porous film and a tared receptacle so that they do not overlap. The support is moved in a fixed horizontal path at a constant velocity. A spray is unaware by a switch and applies a ribbon-like spray pattern normal to the path of travel of the support. The spray is started before the support passes thereunder and stopped thereafter. Movement of the support is terminated after it has passed under the spray. The receptacle is removed from the platform and weighed and the gloss of the film is measured. The porosity is then computed.

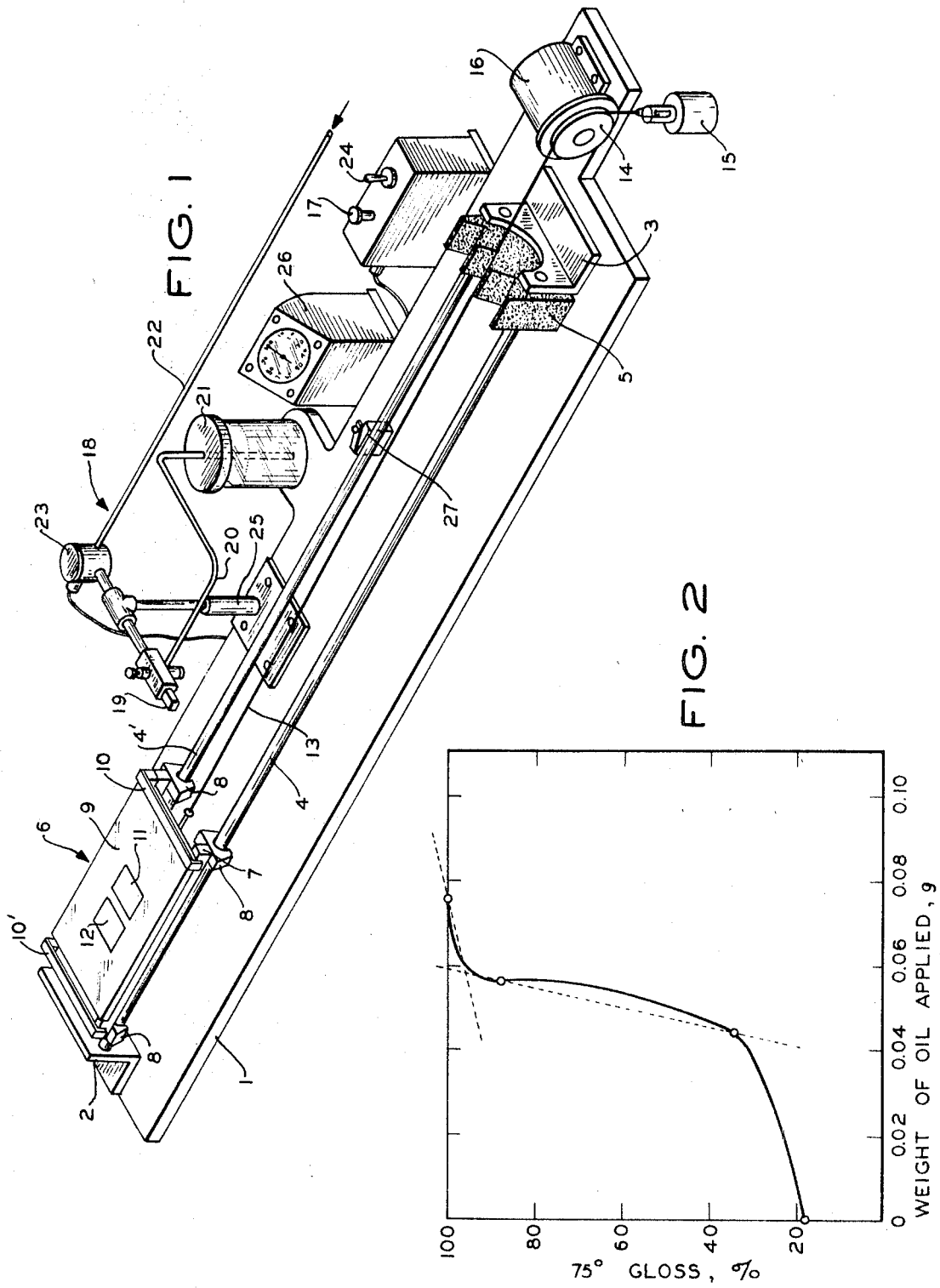

SYSTEM AND METHOD FOR MEASURING FILM POROSITY

BACKGROUND OF THE INVENTION

Paper such as magazine stock is generally provided with a pigmented film in order to improve the appearance of the paper and to facilitate printing by means such as the offset method. The coating is present as a film that is so thin that the public may be unaware of its presence. A typical clay coating, for example, is only about 10 microns thick.

The ink holdout characteristics of the coated sheet are significantly affected by the porosity of the thin pigmented film. Offset inks include organic vehicles which must penetrate the porous pigment film to a depth sufficient to avoid set off problems in a pile of printed sheets but insufficient to cause undesirable flatting of the ink film. At present printing inks are formulated on an empirical, essentially trial-by-error basis. This is because of the difficulties inherent in measuring the porosity of thin films. A simple method and system for determining the percent of pores in a thin porous film would obviously be of benefit in the printing and paper coating arts.

SUMMARY OF THE INVENTION

An object of this invention is to provide a simple method and system for measuring the porosity of thin films.

This invention results from my discovery that a dramatic increase in gloss is observable when sufficient liquid is applied to a thin porous film to fill exactly all of the pores.

Accordingly, the method for determining the porosity of a thin porous film, in accordance with the present invention, comprises providing a thin porous solid film, the volume of the solids of which is known, and spraying the film with increments of an absorbable liquid which increases the gloss of the film without causing the film to swell. Spraying is carried out in a manner such that the amount of liquid sprayed on the film may be determined. The gloss of the film is periodically measured after it has been sprayed with the liquid and the corresponding amount of liquid absorbed in the film is also determined. From these determinations, an estimation is made of the volume of liquid present in the film when the film had finished undergoing a sharp increase in gloss and a further increment of liquid decreased the rate at which gloss increased. This volume of liquid corresponds to the volume of pores present in the original porous solid film and is used to compute film porosity.

A system for measuring porosity, in accordance with this invention comprises the combination with a gloss meter of: support means including an upper platform for stationing both a thin porous film and a tapered receptacle in a manner such that the film and receptacle do not overlap; means for moving the support in a fixed horizontal path at a constant velocity; spray means including a spray head overlying the path of travel of the support for uniformly directing a spray of liquid under constant pressure onto the platform when the support is travelling at constant speed, whereby the ratio of the quantity of liquid applied to the film to the quantity of liquid applied to the receptacle is equal to the ratio of the cross-sectional areas of the film and the receptacle; means for stopping the spray after the platform has passed thereunder; and means for terminating movement of the support after it has passed under the spray head, whereby the receptacle may be removed from the platform and weighed and the gloss of the film measured after spray has been applied to the film and the receptacle.

BRIEF DESCRIPTION OF THE DRAWINGS

FIG. 1 is a diagrammatic view, partly in perspective, of a system for measuring porosity, the system being adapted to use with a conventional gloss meter.

FIG. 2 is a representative graph obtained by correlating the weight of oil sprayed on a representative porous film with the gloss of the oil-sprayed film.

DETAILED DESCRIPTION

Referring to FIG. 1, a system for determining the porosity of a thin solid porous film in combination with a gloss meter includes a rectangular rigid baseplate 1, suitable wood. An L-shaped metal bracket 2 is adjacent one end of plate 1 and another L-shaped metal bracket 3 is adjacent the other end. Each bracket is fastened to plate 1 by suitable means such as screws. Brackets 2 and 3 support smooth cylindrical metal rods 4 and 4' through recesses provided near the corners of the brackets so that the rods 4 and 4' are parallel and spaced from the baseplate 1. If desired, the rods may be secured to the brackets by welding or the like or they can be slidable in and out of recesses to disassemble the apparatus. Rods 4 and 4' in combination provide a horizontal track overlying baseplate 1. The numeral 5 indicates a cushion adjacent bracket 3, cushion 5 being secured to baseplate 1 through bolts (not shown). The top of cushion 5 contains three U-shaped cuts. Preferably cushion 5 is composed of a resilient material such as a foamed plastic. As illustrated, rods 4 and 4' rest on the outer cuts in the cushion although this is not essential.

A RECTANGULAR SLED, GENERALLY INDICATED BY THE NUMERAL 6, IS ADAPTED TO SLIDE FREELY IN A HORIZONTAL PATH ON THE TRACK FORMED BY RODS 4 AND 4'. The sled includes a rectangular frame 7 and inverted U-shaped clips 8 with smooth inner surfaces secured to the frame at each corner for sliding on rods 4 and 4'. A flat plate 9, suitably a smooth glass plate, rests on the top of frame 7. Hinged clamps 10 and 10' secured to the ends of frame 7 support plate 9 in the frame. By releasing clamps 10 and 10' plate 9 may be lifted and removed from the sled. Plate 9 contains a thin flat porous film 11 of material to be tested, the film 11 being, for example, in the form of a rectangle of predetermined size. Film 11 as illustrated is applied directly on the plate as a result of coating the film-forming material on the smooth surface of the plate and drying the film. A tapered flat piece of aluminum foil 12 provides a receptacle and is mounted with its flat base flush on the upper surface of plate 9 behind film 11 by means of tape (not shown). As illustrated the flat base of foil 12 has a length and width identical to that of the section of test film 11 and the two are aligned and slightly spaced from each other. If desired, film 11 and receptacle 12 may abut.

A system for pulling the sled over tracks 4 and 4' includes a wire cable 13, one end of which is secured to the midpoint of frame 8. The other end of cable 13 passes through the center cut of cushion 5 without touching the cushion and is wrapped once around pulley 14 before terminating in weight 15. A rest (not shown) is located vertically below weight 15, preferably at a distance such that the weight strikes the stop when sled 6 hits cushion 5. Pulley 14 is driven by synchronous motor 16 which is actuated by pushbutton 17. The weight of 15 is so chosen that it will overcome the friction of sled 6 when the sled slides on the track formed by rods 4 and 4'.

The spray system, generally indicated by 18, includes spray head 19 adapted to spray liquid siphoned through tube 20 in liquid container 21 by means of pressurized gas fed through tubing 22 from gas cylinder (not shown) which is provided with valves for adjusting and recording gas pressure. A solenoid 23 in communication with the spray head 19 is activated by switch 24 and is energized by power from motor 16. Spray head 19 is of the type which forms a thin rectangular (ribbon like) spray pattern and is exemplified by "Spray-Set Up No. F1" manufactured by Spraying Systems Co. Spray head 19 and solenoid 23 are supported above the track formed by rods 4 and 4' at an adjustable height by support 25 which is secured to base 1 by screws and includes telescoping vertical rods. The midpoint of spray head 19 is aligned with the midpoint between parallel rods 4 and 4'. The head is mounted at an angle such that the apertures in the head deliver the ribbon like spray of liquid normal to the path of travel of sled 6 when it passes thereunder.

Also secured to an edge of base plate 1 is electrical timer 26 which can be read to 0.01 sec. The timer is actuated by starter button 17 which also starts and stops synchronous motor 16. Microswitch 27, included in the circuit of timer 26, automatically stops the timer when the sled comes to a halt and permits a check on the reproducibility of a given sled cycle.

In operation, a coating composition is uniformly applied to the roughened surface of glass plate 9, and the coating is dried to form the porous solid film to be tested. A rectangular section of the dry coating, e.g., a 3-inch × 5-inch section, is carefully scraped from the plate. This may be accomplished by placing templates of suitable dimensions on the plate and scraping the desired cross-sectional area of the coating. The scraped material is weighed on an analytic balance. The volume of the solids in the scraped material is calculated by multiplying the weight percent of each solid constituent of the dried film by its density, adding these values, and then multiplying the result by the weight of the sample.

The coating remaining on the glass plate after the sample has been removed for weighing is removed except for a section of test film 11 of desired cross-sectional area, suitably a section having the same cross-sectional area (e.g., 3 inches × 5 inches) as the area from which the scrapings were weighed. In this way, the volume of solids in film 11 is predetermined. When scraping material from plate 9 it is necessary to leave room on the plate for a tapered receptacle of suitable dimension, e.g. aluminum foil, so that the receptacle does not overlap any portion of film 11. The flat base of foil 12 preferably has the same length and width, e.g., 3 inches × 5 inches, as film 11. The foil and the film are a aligned in a manner such that sides of the same dimensions are parallel. A small space between the adjacent sides of film 11 and foil is satisfactory or, as mentioned, the sides may abut. After foil 12 is suitably located on plate 9 adjacent film 11, the foil is secured to the plate by removable tape. The plate is then placed in frame 7 and secured by closing hinged clips 10 and 10'. Unless the sled is already at a starting position against bracket 2 it is brought there by removing weight 15 and pushing sled 6 towards bracket 2.

A charge of liquid which readily sorbed by the coating without causing the film to swell is charged to vessel 21. A lightweight mineral oil having a viscosity at 25° C. of about 0.4 poise and density of 0.83 g./cm.$^3$ is generally satisfactory when testing the porosity of clay coatings.

With the sled at the starting position and the test film and receptacle on the sled, the spray is started by moving switch 24 to activate solenoid 23. After start-up the spray is allowed to issue for a few seconds in order to reach an equilibrium rate. Button 17 is then pressed in order to start synchronous motor 16 which drives the pulley 14 and thereby causes cable 13 to pull sled 6 towards bracket 3. The sled achieves equilibrium velocity before it passes under spray head 19. In practice, an equilibrium velocity of 3 ft./sec. has been obtained in the first 2 cm. of travel. While sled 6 is moving at equilibrium velocity, it passes under spray head 19 and the film 11 is provided with a ribbonlike deposit of liquid as it intercepts the path of the sprayed liquid. After this occurs, the ribbonlike spray is caught in foil 12. When the sample and the receptacles have the same length and width, the same volume of liquid will be applied to the sample and the receptacle as the sled passes under the spray head because the sled travels at essentially constant speed and the liquid is sprayed at a constant volume rate of flow. The volume of liquid applied per cycle is adjusted by varying the height of the spray head or by varying the diameter of the pulley that is operated by the synchronous motor. The volume is so selected that a multiplicity of cycles, e.g., 7 or 8 cycles, is needed to fill completely the pores of the film.

As soon as foil 12 has moved past the path of liquid sprayed from head 19, the spray is stopped by closing switch 24 which operates the solenoid.

Equilibrium velocity of sled 6 is maintained substantially until the sled hits cushion 5 or when weight 15 hits the floor or other stop means. As mentioned, the actions will occur simultaneously if the length of the cable between the sled and the cushion when the sled is in starting position is equal to the distance the weight travels before it is stopped.

The cycle is repeated by removing weight 15, pushing sled 6 back to its starting position with its near edge along bracket 2, and reattaching weight 15. Switch 24 is then passed to activate solenoid 23 and then motor 16 and the timer are started by pressing button 17.

After a cycle (or a suitable number of cycles) has been completed, the glass plate 9 is removed from the sled 6 by opening clips 10 and 10'. The gloss of film 11 on the plate is tested with a suitable gloss meter, preferably a meter such as the Hunter instrument which measures 75° gloss. Generally it is not necessary to measure gloss after each sled run since measurements are only necessary near the end point of a run when the pores begin to fill up completely and gloss rapidly increases. When a gloss measurement is made the tared aluminum foil should also be removed from plate 9 by lifting the tape. The tared foil is then weighed and the gloss and weight of liquid in the receptacle are tabulated.

The procedure is repeated until gloss undergoes a rapid increase and then the rate of gloss levels off. A graph correlating weight or volume of liquid vs. gloss is made and, from the graph, the quantity of liquid needed to fill completely the pores in the film is estimated.

FIG. 2 shows a typical curve of 75° gloss vs. weight of oil applied to a 3-inch × 5-inch porous clay film. The curve includes a pair of dotted lines, one of the lines connecting points corresponding to a rapid increase in gloss per unit weight of oil applied. The other lines connect points representing values corresponding to a subsequent less rapid increase in gloss per unit weight of oil applied. The point of intersection of the two dotted lines represents the weight of oil that was applied when the pores were just filled with oil.

In an illustrative example, a thin clay film was deposited on a clean 6-inch × 12-inch black glass plate having a mechanically ground flat surface. The plate was coated with a 60 percent solids deflocculated clay-water slip and the thickness of the coating was controlled by a Bird bar of the type used in coating paper. The coating was air dried at room temperature. By placing templates of suitable size over the coating and carefully scraping uncovered coating with razor, a 3-inch × 5-inch section of coating was retained on the plate. The coating scraped from an identical area was weighed on an analytical balance. From the weight of the coating scraped from the plate the volume of clay in a 3-inch × 5-inch section of coating was calculated, using 2.58 gm./cm.$^3$ as the value for clay density.

The glass plate containing the 3-inch × 5-inch coating was mounted on the shed and a 3-inch × 5-inch piece of tared aluminum foil was mounted on the uncoated portion of the glass plate adjacent to the clay coating so that the foil would pass under the spray head immediately after the coating had been sprayed. Gloss measurements and corresponding weight of oil for a typical run appear in a publication by G. A. Hemstock et al., "STUDIES OF RELATIONSHIP BETWEEN SUSPENSION AND PAPER COATING FILM PROPERTIES," TAPPI, Nov. 1968, Vol. 51, page 492. Data in FIG. 4 of this publication show that the pores of the clay coating were just filled with oil when 0.058 gm. oil was applied. The oil that was used had a density of 0.83 gm./cm.$^3$. Thus, 0.069 cm.$^3$ oil was used with a 3-inch × 5-inch coating. Film porosities were calculated as follows:

$$\text{Percent porosity} = \frac{\text{vol. oil (cc.)} \times 100}{\text{vol. oil (cc.)} \times \text{wt. coating (g.)}/2.58}$$

Values ranged from 34.3 to 39.5 percent for various coatings made up with various clays.

For a coating composed of 80 percent clay (density 2.58 g./cc.) and 20 percent starch (density 0.9 g./cc.) the calculation would be modified to account for the larger void-free volume of solids resulting from the pressure of 20 percent starch.

Although the present invention is particularly well suited for measuring the porosity of pigment films, the method and system are not limited to this specific application since the invention is applicable to the evaluation of any porous film which will increase rapidly in gloss when the pores in the film become filled with a liquid of appropriate composition.

I claim:

1. A method for determining the porosity of a porous film which comprises:

providing a porous dry film of known weight and specific gravity, spraying said film uniformly with a sorbable liquid which does not swell the dry film, periodically measuring the total amount of liquid sprayed on said film and the gloss of the film, and repeating the procedure, from said measurements, determining the total volume of liquid that had been applied to the film when the film ceased undergoing a maximum increase in gloss per unit of liquid added, and, using said liquid volume, computing the volume of pores in the film.

2. A method for determining the porosity of a porous solid pigmented film which comprises:

providing a sample of dry porous film of known composition, weight and cross-sectional area and a tared uncovered receptacle also of known cross-sectional area, placing said film and said receptacle on a horizontal flat surface member in a manner such that the film and the receptacle do not overlap, moving said flat surfaced member with said film and said receptacle in a horizontal fixed path in a manner such that said member travels at a constant speed during at least a portion of said movement, while said member is traveling at constant speed, spraying said film and thereafter said tared receptacle with an oil that increases the gloss of said film when sorbed therein, the oil being sprayed in a ribbonlike pattern and at a constant volume rate of flow, whereby the film and the receptacle are proportional to their cross-sectional areas, repeating said procedure, periodically measuring the weight of the oil in the receptacle and measuring the gloss of said film until the rate at which gloss increases per unit weight of oil applied begins to decrease, ascertaining the weight of oil in the receptacle when the gloss underwent a substantial increase, corresponding to a condition in which pores in the film were just filled with oil, from this value and the relative cross-sectional areas of the receptacle and the film and the specific gravity of the oil, computing the volume of oil applied to the film when the pores were just filled with oil, and, using the resulting value to calculate porosity in accordance with the equation:

$$\text{Percent porosity} = \frac{\text{volume of oil} \times 100}{\text{volume of oil} + \text{volume of solids}}$$

3. A system for use in conjunction with a gloss meter for determining the porosity of a film which comprises:

a. support means for holding a flat film and a receptacle in a manner such that they do not overlap when placed on said support, b. means including a straight track and a motor for moving said support means with film and receptacle in a fixed linear path in a manner such that the speed is constant over at least a portion of said path, c. stationary spray means for applying a spray of liquid normal to the travel of said support at a location at which the support travels at constant speed, the pattern of the openings in said spray means being such that liquid issuing therefrom forms a ribbonlike pattern, whereby a receptacle and film on the support are separately sprayed when the support passes under the spray and the weight of liquid sprayed on each is proportionate to its cross-sectional area, d. means for terminating movement of said support after it has passed under said spray, e. means for starting said spray before said support passes thereunder and for stopping the spray afterwards, f. and a gloss meter positioned above the path of movement of said flat film for measuring the gloss of said film.

UNITED STATES PATENT OFFICE
CERTIFICATE OF CORRECTION

Patent No. 3,589,173  Dated June 29, 1971

Inventor(s) Glen A. Hemstock

It is certified that error appears in the above-identified patent and that said Letters Patent are hereby corrected as shown below:

In the ABSTRACT, line 14, "A spray is unaware" should read -- A spray is activated --. Column 1, line 41, "responding amount of liquid absorbed" should read -- responding amount of liquid sorbed --; line 71, "the system being adapted to" should read -- the system being adapted for --. Column 2, line 38, "A tapered flat" should read -- A tared flat --. Column 3, line 26, "room on the plate for a tapered" should read -- room on the plate for a tared --.

Signed and sealed this 23rd day of May 1972.

(SEAL)
Attest:

EDWARD M. FLETCHER, JR.                ROBERT GOTTSCHALK
Attesting Officer                      Commissioner of Patents